P. A. E. ARMSTRONG.
ROLLER BEARING.
APPLICATION FILED APR. 13, 1917.
1,376,309.
Patented Apr. 26, 1921.
2 SHEETS—SHEET 1.
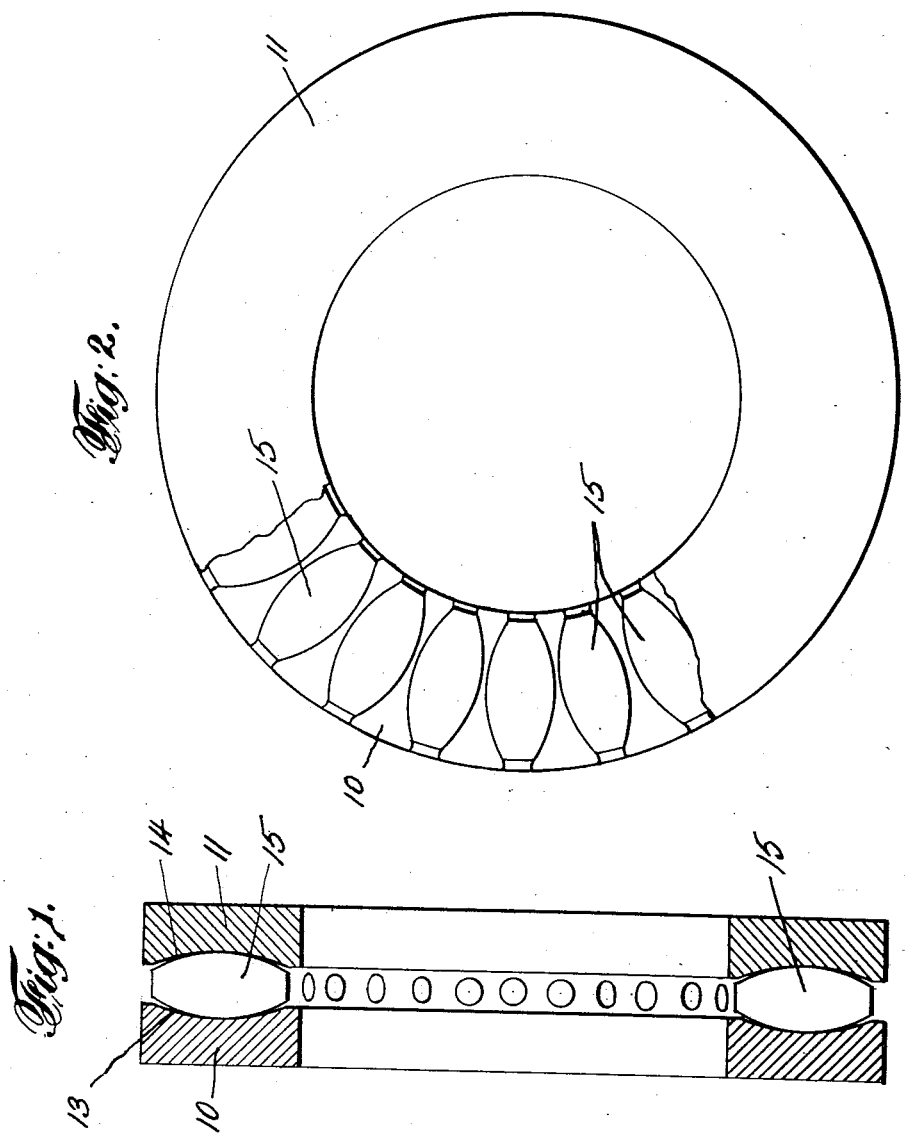

P. A. E. ARMSTRONG.
ROLLER BEARING.
APPLICATION FILED APR. 13, 1917.

1,376,309.

Patented Apr. 26, 1921.
2 SHEETS—SHEET 2.

INVENTOR
Percy A. E. Armstrong
By Prindle, Wright & Small ATTORNEYS

UNITED STATES PATENT OFFICE.

PERCY A. E. ARMSTRONG, OF NEW YORK, N. Y.

ROLLER-BEARING.

1,376,309.  Specification of Letters Patent.  Patented Apr. 26, 1921.

Application filed April 13, 1917. Serial No. 161,719.

*To all whom it may concern:*

Be it known that I, PERCY A. E. ARMSTRONG, of New York city, in the county of New York, and in the State of New York, have invented a certain new and useful Improvement in Roller-Bearings, and do hereby declare that the following is a full, clear, and exact description thereof.

My invention relates to roller bearings, and particularly to thrust bearings which may be used for any desired purposes and in any apparatus in which ball bearings or roller bearings find application.

One object of my invention is the provision of race members curved transversely in the arc of a circle and of rollers curved longitudinally in an arc of a different radius from that of the bearing surface of the race members. In this way, the engagement between bearing surfaces, though substantially greater than in the case of ball bearings, is limited to a substantially narrow zone or region, and within such bearing region the contacting surfaces run at substantially the same speed. With this construction, slippage and friction resulting from surfaces bearing on one another when running at different rates of speed is avoided and a smooth running and long lived bearing is obtained.

A further object is to construct roller bearings of this character, which are so arranged that the axis of the roller is being continuously turned so that the rollers normally follow a circular path owing to a slight difference in the diameter of one of the races from the other. Further objects of my invention will appear from a detailed description thereof contained hereinafter.

While my invention is capable of embodiment in many different forms, for the purpose of illustration I have shown only certain forms thereof in the accompanying drawings, in which—

Figure 1 is a vertical section of a single thrust bearing made in accordance with my invention, the rollers being convex;

Fig. 2 is a front elevation of the same showing one of the race members partly broken away;

Figure 3:
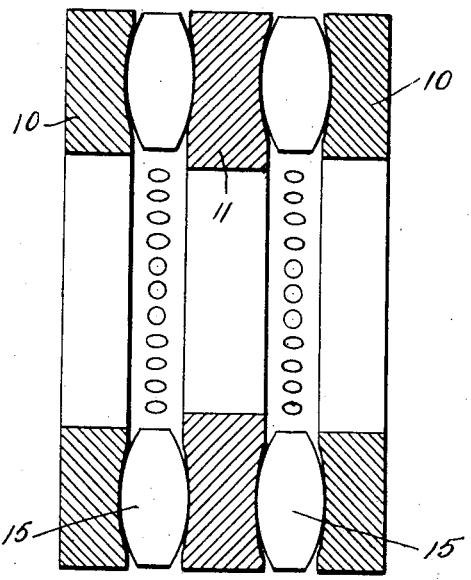
Fig. 3 is a vertical section of a double thrust bearing made in accordance with my invention, the rollers being convex.

The thrust bearing shown in Figs. 1 and 2 is comprised of two race members 10 and 11 which are laterally spaced and have bearing surfaces 13 and 14 respectively made on curves, which are circular in the plane of Fig. 1, but somewhat larger than the curves of convex rollers 15 in said plane. Furthermore, the diameter of the race member 11 is slightly smaller than the diameter of the race member 10 so as to slightly tilt the rollers 15 and cause them to roll naturally in a circular path, the longitudinal axis of the roller being continually turned toward the center of the bearing as it rotates.

Figure 4:
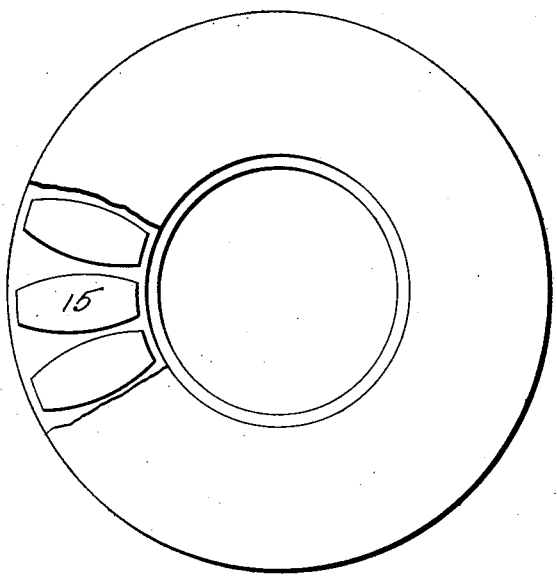
Fig. 4 is a front elevation of the same.

The roller bearing shown in Figs. 3 and 4 is constructed the same as the roller bearing shown in Figs. 1 and 2, except that a double bearing is made use of.

Figure 5:
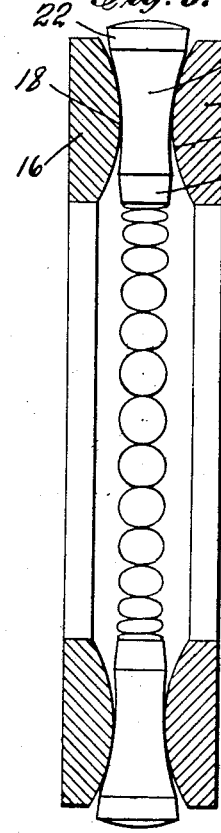
Fig. 5 is a vertical section of another single thrust bearing in which cages are not necessary, and in which the rollers are concave.
Figure 6:
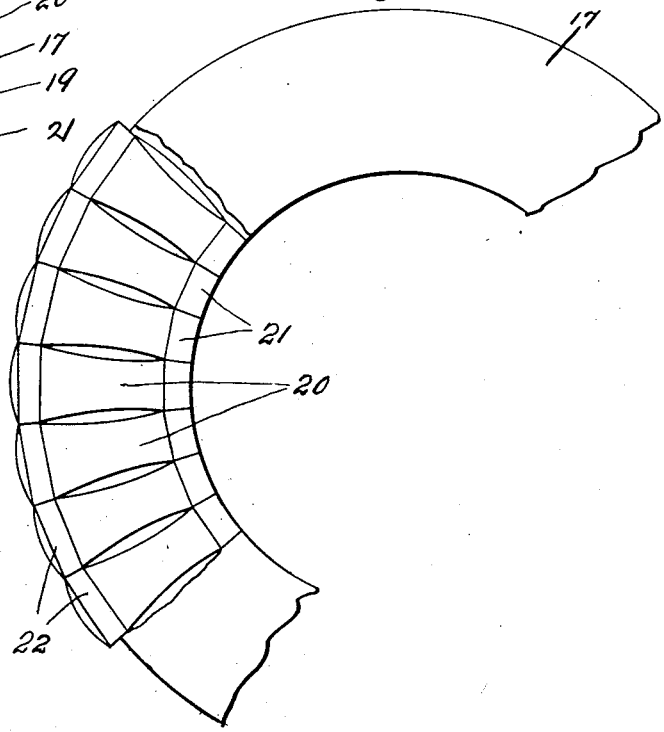
Fig. 6 is a front elevation of the same showing one of the race members partly broken away.

The bearing shown in Figs. 5 and 6 is constructed the same as the bearing shown in Figs. 1 and 2, except in the following respects: In this instance there are provided laterally spaced parallel race members 16 and 17 having bearing surfaces 18 and 19 which are circular in the plane of Fig. 5, but made on smaller circles than the curvature of the concave rollers 20 carried between the same. The rollers 20 have inner conical extensions 21 and outer conical extensions 22 so as to retain said rollers in place without the necessity of using cages.

With the different forms of my invention above described in detail it is seen that owing to the use of rollers there is a comparatively small pressure per square inch and a very uniform pressure on the bearing surface under load. The bearing surface is, however, a restricted area near the center of the roller. It is, consequently, a simple matter to provide accurately ground surfaces on the individual rollers. Furthermore, the rollers may be readily made owing to the fact that it is not necessary to produce straight lines in the surfaces of the same, but, on the contrary, said surfaces may be made from a fixed pivot as by grinding the surfaces upon a circle. If desired, however, it is to be understood that other curvatures may be provided for the rollers, as for example, parabolas, hyperbolas, ellipses, etc. Where the rollers carry end flanges, it is not necessary to make use of cages. The provision of one of the race members made on a smaller diameter than the other, enables the rollers to be tilted so as to cause them to assume a substantially radial position with regard to the center of the race members and to follow a circular path, thus obviating the friction which would be present in case the rollers tended to follow a straight path.

While I have described certain embodiments of my invention above in detail, I wish it to be understood that many changes may be made therein without departing from the spirit of my invention.

I claim—

1. A thrust bearing comprising a pair of annular race members and a roller having substantially point contact with each of said race members, one of the races of said members being slightly smaller in diameter than the other, whereby the axis of the roller tends constantly to assume a radial position with regard to the race members.

2. A thrust bearing comprising a pair of annular race members and a roller having substantially point contact with each of said race members, said members being located in substantially parallel planes and one of the races of said members being slightly smaller in diameter than the other, whereby the axis of the roller tends constantly to assume a radial position with regard to the race members.

3. A thrust bearing comprising laterally spaced parallel race members having bearing surfaces on their adjacent faces, said surfaces being curved transversely in an arc of a circle, a roller having its surface longitudinally curved in an arc of different radius than the radius of the bearing surfaces, one of said bearing surfaces being slightly smaller in diameter than the other.

4. A thrust bearing comprising laterally spaced parallel race members having bearing surfaces on their adjacent faces, said surfaces being concaved transversely in an arc of a circle, a roller having a surface longitudinally convexed in an arc of smaller radius than the radius of the bearing surfaces, one of said bearing surfaces being slightly smaller in diameter than the other.

5. A thrust bearing comprising a pair of parallel race members and an intermediate race member having bearing surfaces curved transversely in an arc of a circle, rollers located between said intermediate member and each of said first mentioned members and having their surfaces longitudinally curved in an arc of different radius than the radius of said bearing surface, the bearing surfaces on the intermediate member being slightly different in diameter than the others.

6. A thrust bearing comprising a pair of parallel race members and an intermediate race member having bearing surfaces concaved transversely in an arc of a circle, rollers located between said intermediate member and each of said first mentioned members and having their surfaces longitudinally convexed in an arc of smaller radius than the radius of said bearing surface, the bearing surfaces on the intermediate member being slightly different in diameter than the others.

7. A thrsut bearing comprising a pair of laterally spaced parallel race members having bearing surfaces on their adjacent faces, said surfaces being curved transversely in an arc of a circle, and a roller having its surface longitudinally curved in an arc of different radius than the radius of the bearing surfaces, and making substantially point contact with each of the bearing surfaces.

8. A thrust bearing comprising a pair of laterally spaced parallel race members having bearing surfaces on their adjacent faces, said surfaces being concaved transversely in an arc of a circle, and a roller having its surface longitudinally convexed in an arc of different radius than the radius of the bearing surfaces, and making substantially point contact with each of the bearing surfaces.

In testimony that I claim the foregoing I have hereunto set my hand.

PERCY A. E. ARMSTRONG.